United States Patent
Chen

(10) Patent No.: US 7,202,921 B2
(45) Date of Patent: Apr. 10, 2007

(54) BACKLIGHT UNIT FOR A LIQUID CRYSTAL DISPLAY

(75) Inventor: Hao-Chih Chen, Taichung (TW)

(73) Assignee: AU Optronics Corp., Hsinchu (TW)

( * ) Notice: Subject to any disclaimer, the term of this patent is extended or adjusted under 35 U.S.C. 154(b) by 36 days.

(21) Appl. No.: 09/905,792

(22) Filed: Jul. 13, 2001

(65) Prior Publication Data

US 2002/0093603 A1 Jul. 18, 2002

(30) Foreign Application Priority Data

Jan. 16, 2001 (TW) .............................. 90100899 A

(51) Int. Cl.
*G02F 1/1335* (2006.01)
*G02F 1/1333* (2006.01)

(52) U.S. Cl. .......................................... 349/65; 349/58

(58) Field of Classification Search ................. 349/67, 349/113, 58, 60, 61–65; 362/26, 31
See application file for complete search history.

(56) References Cited

U.S. PATENT DOCUMENTS

| 5,075,824 A | * | 12/1991 | Tan ............................... 362/31 |
| 5,815,227 A | | 9/1998 | Lee ............................... 349/67 |
| 6,046,785 A | * | 4/2000 | Won ............................... 349/58 |
| 6,480,245 B1 | * | 11/2002 | Sakamoto et al. ............. 349/59 |
| 6,512,557 B1 | * | 1/2003 | Miwa ............................ 349/58 |
| 6,533,633 B2 | * | 3/2003 | Ono ............................. 445/26 |

FOREIGN PATENT DOCUMENTS

| JP | 10-161114 | * | 6/1998 |
| JP | 2001290145 | * | 4/2000 |

OTHER PUBLICATIONS

Merriam Webster's Collegiate Dictionary, 10th Ed. p. 228.*

* cited by examiner

*Primary Examiner*—Dung T. Nguyen
(74) *Attorney, Agent, or Firm*—Ladas & Parry LLP

(57) ABSTRACT

A backlight unit for an LCD is disclosed. The back light unit includes a light guide plate, a reflector, and a light source. The light guide plate has a light receiving lateral side, a first coupling lateral side, and a second coupling lateral side. The first and second coupling lateral sides include a first and a second coupling member, respectively. The reflector is disposed along the light receiving lateral side of the light guide plate, the reflector has a reflective cover, an opening, a first holder, and a second holder. The opening is positioned toward the light receiving lateral side. The first holder has a first linking member and extending toward the first coupling lateral side. The second holder has a second linking member and extending toward the second coupling lateral side. The light source is installed in the reflector, the light emitted from the light source is reflected by the reflective cover and then transmitted into the light guide plate. The first and second coupling members are respectively combined with the first and second linking members for assembling the reflector and the light guide plate, and a predetermined distance is formed between the light source and the light guide plate.

13 Claims, 5 Drawing Sheets

BACKLIGHT UNIT FOR A LIQUID CRYSTAL DISPLAY

BACKGROUND OF THE INVENTION

1. Field of the Invention

The invention relates to a backlight unit, and more particularly to a backlight unit for improving assembly efficiency, eliminating light leakage, and reducing the thickness of backlight unit.

2. Description of the Related Art

FIG. 1A is a perspective view showing a conventional backlight unit for a liquid crystal display. As shown in FIG. 1A, a backlight unit includes a frame 10, a light guide plate 40, and a reflector 30. The side plates 32 of the reflector 30 are assembled with the frame 10 by positioning the screws 35 into holes (not shown) of the frame 10.

FIG. 1B is an exploded drawing of FIG. 1A. As shown in FIG. 1B, a reflecting sheet 20 is installed on the bottom surface of the light guide plate 40. The light guide plate 40 is positioned on the reflecting sheet 20. The light guide plate 40 has a pair of projection 42, the projections 42 will be inserted into the grooves 12 of the frame 10. A lamp 34 is located in the reflector 30, and the side plates 32 of the reflector 30 are assembled with the frame 10 by the screws 35 and the holes 15 of the frame 10. Further, a diffusing means 50 is installed above the light guide plate 40, and the installation of the backlight unit is finished. Generally, the diffusing means 50 includes a diffusing sheet 52, at least one prism sheet 54, and a protecting film 56. The protecting film 56 can also be used as a second diffusing sheet. Finally, a display panel, such as a liquid crystal panel 60, is installed above the backlight unit, and the installation of a display is finished.

In a liquid crystal display, the diffusing means and the light guide plate can be used for improving the luminance uniformity. In addition, the inserting dimension between the lamp and the light guide plate can also affect the luminance uniformity of the LCD. When the inserting dimension between the lamp and the light guide plate is too short, a light line will appear on the LCD (known as "Kido Mura" phenomenon), and the light guide plate will be overheated and damaged. When the inserting dimension between the lamp and the light guide plate is too large, a dark line will appear on the LCD, and the light guide plate will be loosed from the reflector easily. In the prior art, both the lamp 34 and the light guide plate 40 are fixed to the frame 10. During the usage of the LCD, the lamp 34 provides not only light but also heat. A part of the light guide plate 40 near the lamp 34 will expand at hot condition and shrink at cold condition. Therefore, the precision of the inserting dimension between the lamp and the light guide plate will be reduced, and also decreasing the tolerance between the frame and the light guide plate. Therefore, light lines or dark lines are prone to appear on the conventional backlight unit.

U.S. Pat. No. 5,815,227 discloses a backlight unit for a liquid crystal display. As shown in FIG. 2, at least two locking protrusions 44 are formed on the light guide plate 40, and at least two locking holes 36 are formed on the reflectors 30. After the locking protrusions 44 are inserted into the locking holes 36, the light guide plate 40 is directly coupled with the reflector 30. Therefore, the precision of the inserting dimension between the lamp and the light guide plate is improved.

However, the locking protrusions 44 of the light guide plate 40 increase not only the thickness of the backlight unit, but also the thickness of the liquid crystal display. Moreover, light will emit around the locking protrusions 44, so light leakage will occur at the display area of the display panel. In order to reduce the light leakage, the locking protrusion 44 is positioned away from the display area by increasing the size of the light guide plate 40, or the locking protrusion 44 is covered by a non-transparent component. Unfortunately, the methods will increase the area and/or thickness of the display. The prior arts are unable to manufacture a light and compact liquid crystal display.

SUMMARY OF THE INVENTION

To solve the above problems, an object of the present invention is to provide a backlight unit for a liquid crystal display. The backlight unit comprises a light guide plate, a reflector, and a light source. The light guide plate has a light receiving lateral side, a first coupling lateral side, and a second coupling lateral side. The first coupling lateral side has a first coupling member and the second coupling lateral side has a second coupling member. The reflector has a reflective cover, an opening, a first holder, and a second holder. The reflector is disposed along the light receiving lateral side of the light guide plate, and the opening of the reflector is disposed toward the light receiving lateral side. The first holder extends toward the second coupling lateral side. The first and second holders have a first and a second linking member, respectively. A light source is installed inside the reflective cover, the light emitted from the light source is reflected by the reflective cover and then transmitted into the light guide plate. The first coupling lateral side has a first coupling member, and the second coupling lateral side has a second coupling member. The first and second coupling members can be protrusions, and the first and second linking members can be recesses. Therefore, the first and the second coupling members are respectively combined with the first and second linking members for assembling the reflector and the light guide plate. A predetermined distance is formed between the light source and the light guide plate.

One advantage of the invention is to reduce the thickness of the LCD by positioning the first and second coupling members on the two opposite coupling lateral sides, respectively.

Another advantage of the invention is to reduce the phenomenon of light leakage by positioning the first and second coupling members on the two opposite coupling lateral sides, respectively.

Another advantage of the invention is to improve the assembly efficiency by directly mounting the light guide plate and the reflector.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE
PREFERRED EMBODIMENTS

Figure 1A:
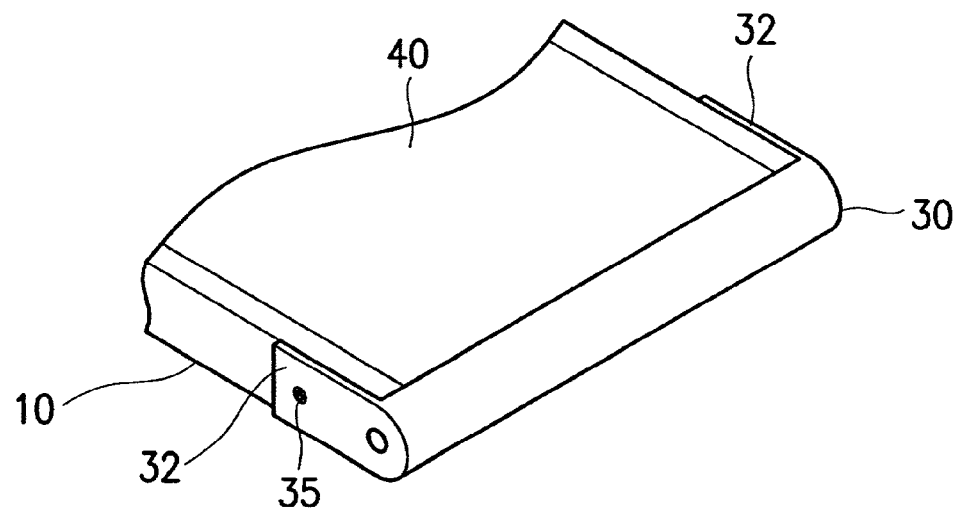
FIG. 1A is a diagram showing a conventional backlight.
Figure 2:
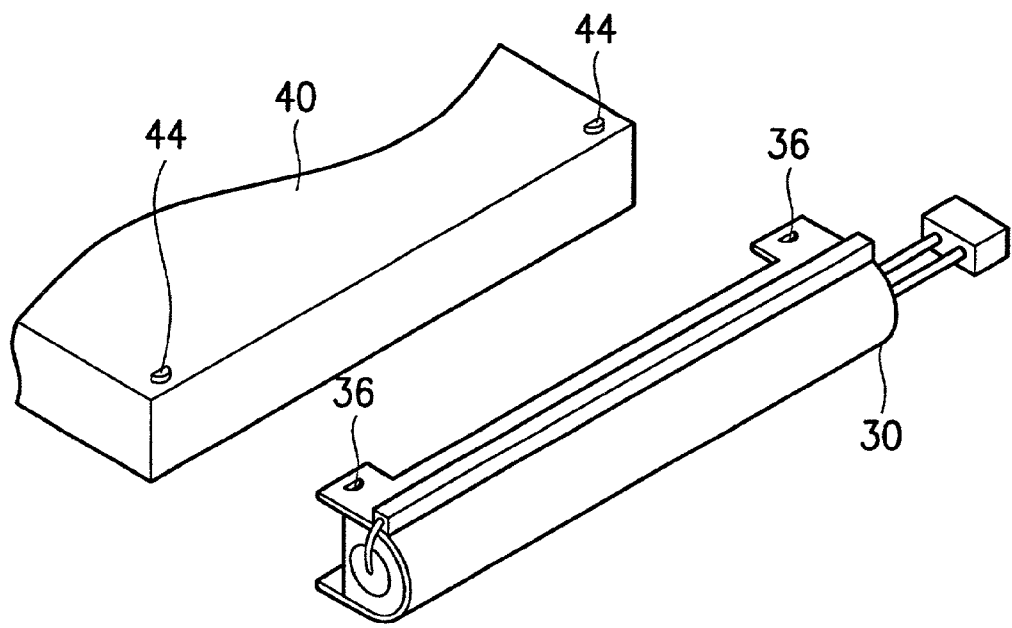
FIG. 2 is a schematic view of another conventional backlight.
Figure 1B:
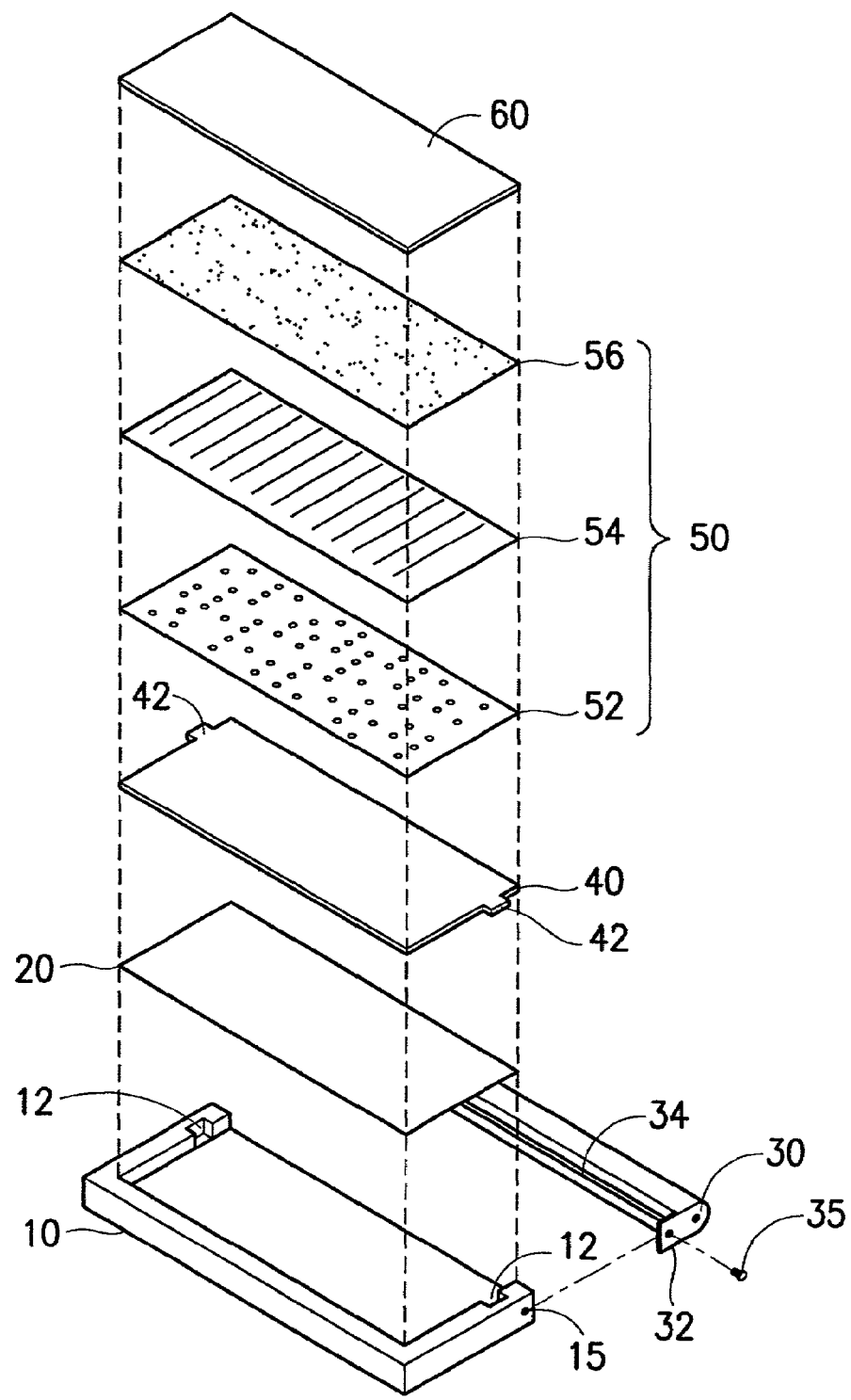
FIG. 1B is a perspective view of a conventional backlight shown in FIG. 1A.
Figure 3:
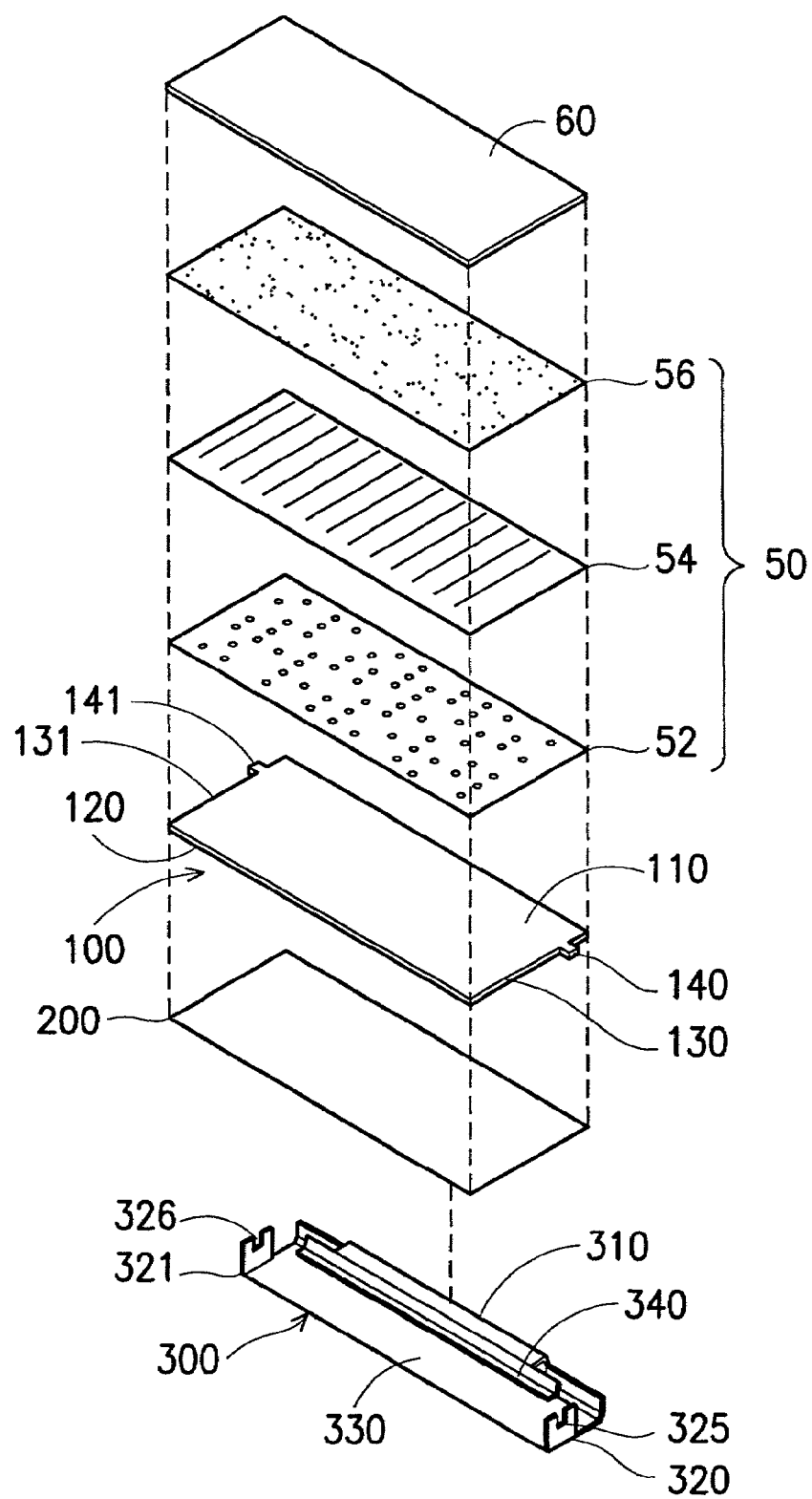
FIG. 3 is a schematic view showing a backlight unit of the present invention.

FIG. 3 is an exploded view showing a backlight unit of the present invention. The backlight unit can be applied to a liquid crystal display. As shown in FIG. 3, the backlight unit includes a light guide plate 100, a reflecting sheet 200, a reflector 300, and a light source. The light source can be a lamp 340. The reflecting sheet 200 is installed under the light guide plate 100. The light guide plate 100 has a light emitting surface 110, a bottom surface 120, a light receiving lateral side (not shown), a first coupling lateral side 130, and a second coupling lateral side 131. The light emitting surface 110 is approaching a light incident surface 62 of a liquid crystal panel 60, and the bottom surface 120 is positioned above the reflecting sheet 200. The light guide plate 100 further includes a first coupling member 140 and a second coupling member 141. The first coupling member 140 is formed on the first coupling lateral side 130 and the second coupling member 141 is formed on the second coupling lateral side 131. The first and second coupling members 140, 141 could be two protrusions 140, 141. The reflector 300 has a reflective cover 310, an opening 330, a first holder 320, and a second holder 321. The reflector 320 is disposed along the light receiving lateral side, and the opening 330 of the reflector 300 is disposed toward the light receiving lateral side. The first and second holders 320, 321 are extended toward the first coupling lateral side 130 and the second coupling lateral side 131. The lamp 340 is positioned inside the reflective cover 310. A portion of the light emitted from the lamp 340 is reflected by the reflective cover 310 and then transmitted into the light guide plate 100. The first and the second holders 320, 321 have a first linking member 325 and a second linking member 326, respectively. The first and second linking members could be two recesses 325, 326. The reflector 300 is assembled with the light guide plate 100 by inserting the first protrusion 140 into the first recess 325 and inserting the second protrusion 141 into the second recess 326. Therefore, a predetermined distance, call as the inserting dimension, between the lamp 340 and the light guide plate 100 is formed.

Figure 4A:
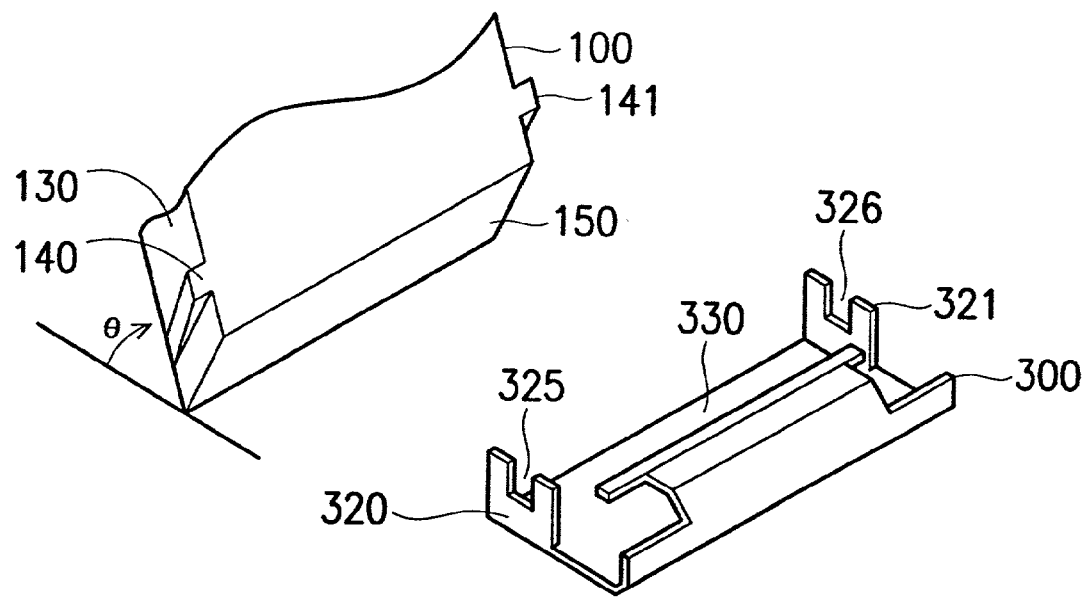
FIGS. 4A to 4C are schematic views illustrating the assembly of a backlight and a reflector in accordance with the present invention.
Figure 4B:
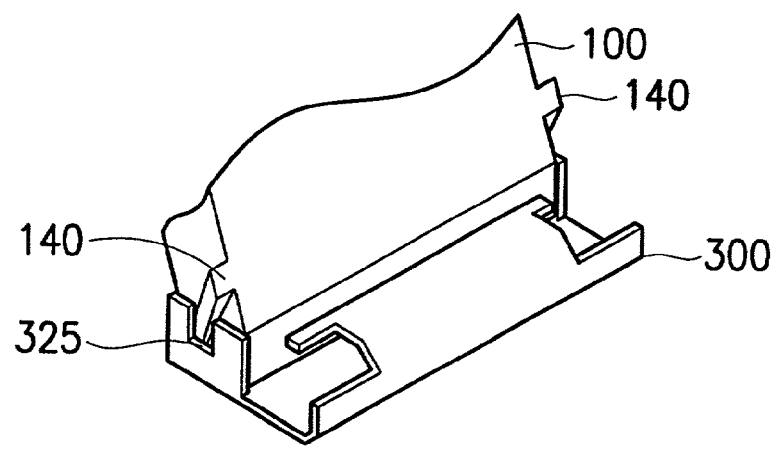
Figure 4C:
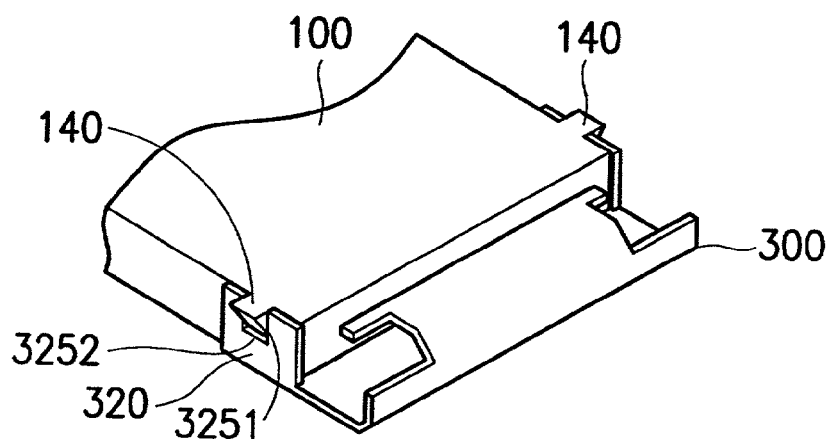

FIGS. 4A to 4C are schematic views illustrating the assembly of the backlight and the reflector in accordance with the present invention. As shown in FIG. 4A, an inclined angle θ is formed between the light guide plate 100 and the horizontal surface (the angle θ is about 45 degrees). First, the light receiving lateral side 150 of the light guide plate 100 is positioned to face the opening 330 of the reflector 300. Next, as shown in FIG. 4B, the light guide plate 100 is inserted into the opening 330 of the reflector 300 at an angle, the protrusions 140, 141 of the light guide plate 100 are respectively aimed at the recesses 325, 326 of the reflector 300. Finally, as shown in FIG. 4C, the light guide plate 100 is rotated to insert the first and second protrusions 140, 141 into the first and second recesses 325, 326. In order to improve the assembly efficiency of the backlight unit, each protrusion has inclined sidewalls, each inclined sidewall is tilted toward the recess. As shown in FIG. 4C, the recess 325 has an opening 3251 and a bottom 3252, the protrusion 140 has a top surface and a bottom surface. The top surface of the protrusion 140 approaches the opening 3251 and the bottom surface approaches the bottom 3252. The area of the top surface is larger than the area of the bottom surface, and thus the protrusion has a wedged shape. As the area of the bottom surface is zero, the protrusion is a triangular wedge.

Figure 5A:
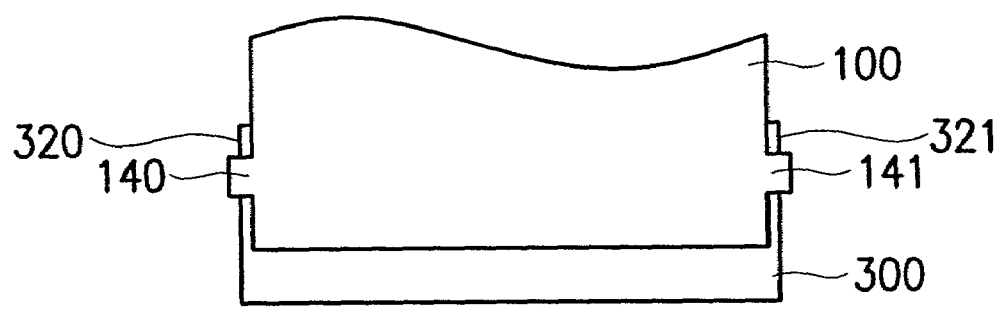
FIG. 5A is a schematic view illustrating the first assembly state of a backlight and a reflector in accordance with the present invention.
Figure 5B:
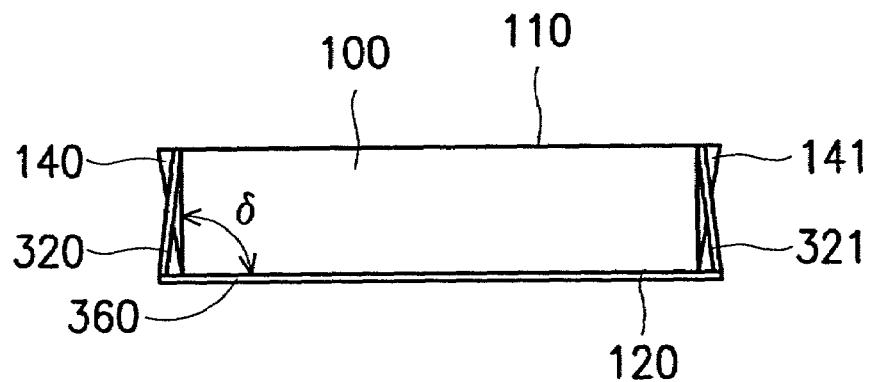
FIGS. 5B and 5C are schematic views illustrating the second assembly state of a backlight and a reflector in accordance with the present invention.

As shown in FIG. 5A, the two holders 320, 321 are designed to be parallel. In other words, each holder 320, 321 is closed against the lateral sides of the light guide plate 100. As shown in FIG. 5B, the holders 320, 321 can be designed as non-parallel. The reflector 300 further has a base cover 360, an inclined angle δ is formed between the first holder 320 and the base cover 360, the inclined angle δ is less than 90 degrees. In other words, the first and second holders 320, 321 are tilted toward the first and second protrusions 140, 141. As the liquid crystal display is operated, the light guide plate 100 near the lamp expands because of heat. The light guide plate 100 will push the first and second holders 320, 321, and the inclined angle δ is increased to form a space between each holder and base cover 360. The space can receive the expanding volume of the light guide plate 100. Moreover, the first and second holders 320, 321 can clip the light guide plate 100 so as to prevent the light guide plate 100 being loosen from the reflector 300 easily.

Figure 5C:
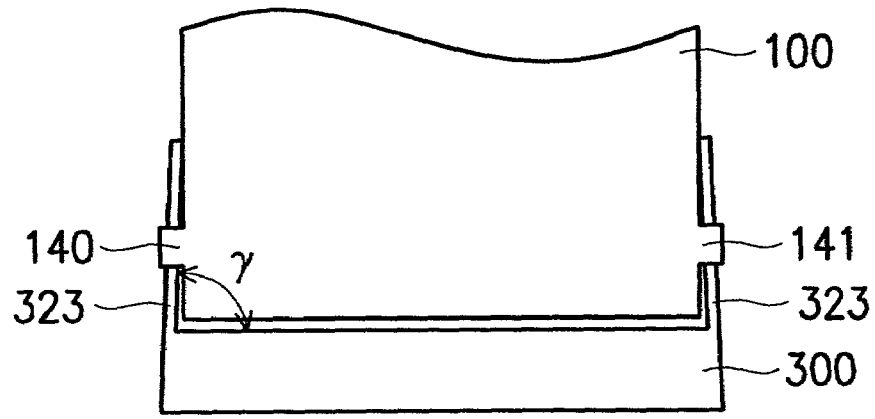

From the top view of FIG. 5C, an angle γ is formed between the first holder 320 and the reflector 300, the angle γ is less than 90 degrees. The two holders 320, 321 are not parallel to each other. Near the opening 340 of the reflector 300, the distance of the two holders 320, 321 is larger than the length of the light guide plate 100. Away from the opening 340 of the reflector 300, the distance of the two holders 320, 321 is almost the same with the length of the light guide plate 100. In other words, the holders 320, 321 are inclined toward the first and second coupling lateral sides of the light guide plate 100. As the liquid crystal display is operated, the light guide plate 100 near the lamp expands because of heat. The light guide plate 100 will push the first and second holders 320, 321, and the inclined angle γ is increased to form a space between each holder and base cover 360. The space can receive the expanding volume of the light guide plate 100.

Further, a diffusing means 50 is positioned above the light guide plate 40. Usually, the diffusing means 50 includes a diffusing sheet 52, at least one prism sheet 54, and a protecting film 56. The protecting film 56 can be used as a second diffusing sheet. Finally, a display panel, such as a liquid crystal panel 60, is installed above the backlight unit, and therefore, the assembly of a display is finished.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A backlight unit for a liquid crystal display, comprising:
   a light guide plate having a light emitting surface, a light receiving lateral side, a first coupling lateral side, and a second coupling lateral side, the first coupling lateral side having a first coupling member and the second coupling lateral side having a second coupling member, wherein the first coupling lateral side and the second coupling lateral side are generally perpendicular to the light emitting surface;
   a diffusing means corresponding to the light emitting surface;
   a reflector disposed along the light receiving lateral side, said reflector having a reflective cover, an opening, a first holder, and a second holder, the opening positioned toward the light receiving lateral side, the first holder extending toward the first coupling lateral side and the second holder extending toward the second coupling lateral side, the first holder having a first linking member, and the second holder having a second linking member; and a light source installed inside the reflector, the light emitted from the light source being reflected by the reflective cover and transmitted into the light guide plate, wherein the first and second coupling members are respectively directly combined with the first and second linking members for assembling the reflector and the light guide plate, and a predetermined distance is formed between the light source and the light guide plate, wherein the reflector further includes a base cover, an angle is formed between the first holder and the base cover, the angle is less than 90 degrees;

as the light guide plate expands when heated, the light guide plate pushes the first holder and the first angle is increased to form a space, and the expanding portion of the light guide plate is received in the space.

2. The backlight unit according to claim 1, wherein the first coupling member is a protrusion, the first linking member is a recess, and the protrusion is positioned in the recess when the first coupling member combines with the first linking member.

3. The backlight unit according to claim 2, wherein the recess has an opening and a bottom, the protrusion has a top surface approaching the opening of the recess and a bottom surface approaching the bottom of the recess, and the area of the top surface is larger than the area of the bottom surface.

4. The backlight unit according to claim 3, wherein the protrusion has a wedged shape.

5. The backlight unit according to claim 3, wherein the protrusion has a triangular wedged shape.

6. The backlight unit according to claim 1, further comprising a reflecting sheet positioned under the light guide plate.

7. The backlight unit according to claim 1, wherein the diffusing means comprises a diffusing sheet, a prism sheet, and a protecting film.

8. The backlight unit according to claim 1, wherein the light source, the reflector, the reflective cover, the first linking member, the second linking member, the first holder, and the second holder are all combined into one piece.

9. The backlight unit according to claim 1, wherein the light source and the reflector are integrally formed in one piece.

10. A backlight unit for a liquid crystal display, comprising:

a light guide plate having a light receiving lateral side, a first coupling lateral side, and a second coupling lateral side, the first coupling lateral side having a first coupling member and the second coupling lateral side having a second coupling member;

a reflector disposed along the light receiving lateral side, said reflector having a reflective cover, an opening, a first holder, and a second holder, the opening positioned toward the light receiving lateral side, the first holder extending toward the first coupling lateral side and the second holder extending toward the second coupling lateral side, the first holder having a first linking member, and the second holder having a second linking member; and a light source installed inside the reflector, the light emitted from the light source being reflected by the reflective cover and transmitted into the light guide plate, wherein the first and second coupling members are respectively combined with the first and second linking members for assembling the reflector and the light guide plate, and a predetermined distance is formed between the reflector and the light guide plate, wherein the first coupling member is a protrusion, the first linking member is a recess, and the protrusion is positioned in the recess when the first coupling member combines with the first linking member, and wherein the recess has an opening and a bottom, the protrusion has a top surface approaching the opening of the recess and a bottom surface approaching the bottom of the recess, and the area of the top surface is larger than the area of the bottom surface.

11. A backlight unit for a liquid crystal display, comprising:

a light guide plate having a light receiving lateral side, a first coupling lateral side, and a second coupling lateral side, the first coupling lateral side having a first coupling member and the second coupling lateral side having a second coupling member;

a reflector disposed along the light receiving lateral side, said reflector having a reflective cover, an opening, a first holder, and a second holder, the opening positioned toward the light receiving lateral side, the first holder extending toward the first coupling lateral side and the second holder extending toward the second coupling lateral side, the first holder having a first linking member, and the second holder having a second linking member; and a light source installed inside the reflector, the light emitted from the light source being reflected by the reflective cover and transmitted into the light guide plate, wherein the first and second coupling members are respectively combined with the first and second linking members for assembling the reflector and the light guide plate, and a predetermined distance is formed between the reflector and the light guide plate, wherein the reflector further includes a base cover, an angle is formed between the first holder and the base cover, the angle is less than 90 degrees; as the light guide plate expands when heated, the light guide plate pushes the first holder and the first angle is increased to form a space, and the expanding portion of the light guide plate is received in the space.

12. A backlight unit for a liquid crystal display, comprising:

a light guide plate having a light emitting surface, a light receiving lateral side, a first coupling lateral side, and a second coupling lateral side, the first coupling lateral side having a first coupling member and the second coupling lateral side having a second coupling member, wherein the first coupling lateral side and the second coupling lateral side are roughly perpendicular to the light emitting surface;

a diffusing means corresponding to the light emitting surface;

a reflector disposed along the light receiving lateral side, said reflector having a reflective cover, an opening, a first holder, and a second holder, the opening positioned toward the light receiving lateral side, the first holder extending toward the first coupling lateral side and the second holder extending toward the second coupling lateral side, the first holder having a first linking member, and the second holder having a second linking member; and a light source installed inside the reflector, the light emitted from the light source being reflected by the reflective cover and transmitted into the light guide plate, wherein the first and second coupling members are concave-convex members, wherein the first and second coupling members are respectively directly combined with the first and second linking members for assembling the reflector and the light guide plate, and a predetermined distance is formed between the light source and the light guide plate, wherein the reflector further includes a base cover, an angle is formed between the first holder and the base cover, the angle is less than 90 degrees:

as the light guide plate expands when heated, the light guide plate pushes the first holder and the first angle is increased to form a space and the expanding portion of the light guide plate is received in the space.

13. A backlight unit for a liquid crystal display, comprising:

a light guide plate having a light emitting surface, a light receiving lateral side, a first coupling lateral side, and a second coupling lateral side, the first coupling lateral side having a first coupling member and the second coupling lateral side having a second coupling member, wherein the first coupling lateral side and the second coupling lateral side are generally perpendicular to the light emitting surface;

a diffusing means corresponding to the light emitting surface;

a reflector disposed along the light receiving lateral side, said reflector having a reflective cover, an opening, a first holder, and a second holder, the opening positioned toward the light receiving lateral side, the first holder extending toward the first coupling lateral side and the second holder extending toward the second coupling lateral side, the first holder having a first linking member, and the second holder having a second linking member; and a light source installed inside the reflector, the light emitted from the light source being reflected by the reflective cover and transmitted into the light guide plate, wherein the first and second coupling members are respectively directly combined with the first and second linking members for assembling the reflector and the light guide plate, and a predetermined distance is formed between the light source and the light guide plate, wherein the first coupling member is a protrusion, the first linking member is a recess, and the protrusion is positioned in the recess when the first coupling member combines with the first linking member, wherein the recess has an opening and a bottom, the protrusion has a top surface approaching the opening of the recess and a bottom surface approaching the bottom of the recess, and the area of the top surface is larger than the area of the bottom surface.

* * * * *